B. M. PADDISON & C. G. EARLENBAUGH.
HEATING ATTACHMENT FOR GAS LAMPS.
APPLICATION FILED OCT. 16, 1917.
1,297,230.
Patented Mar. 11, 1919.
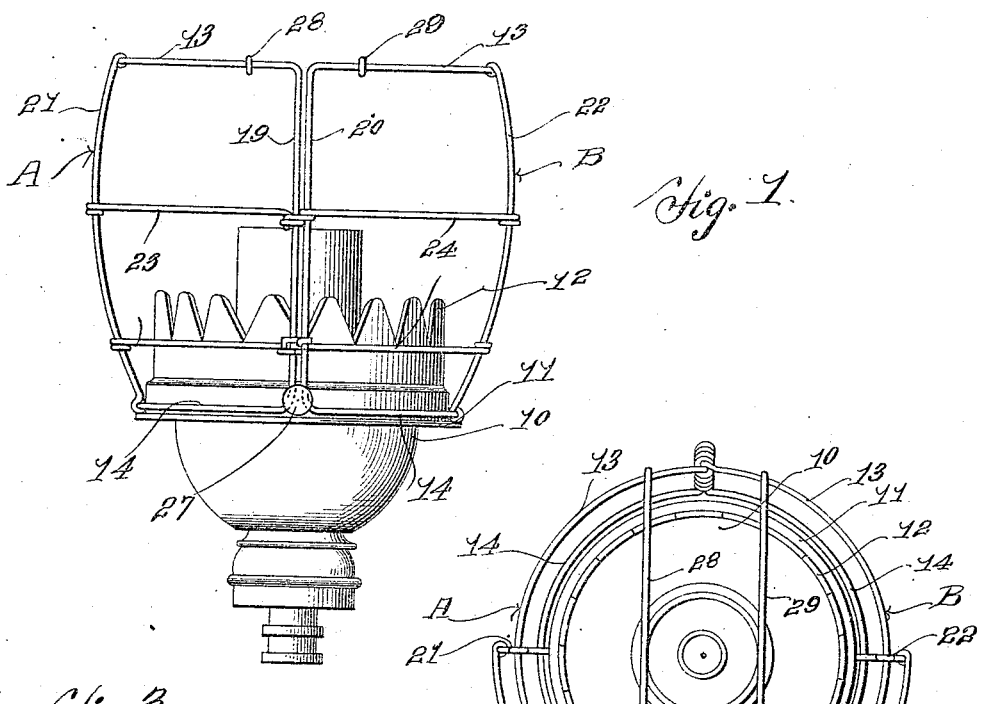
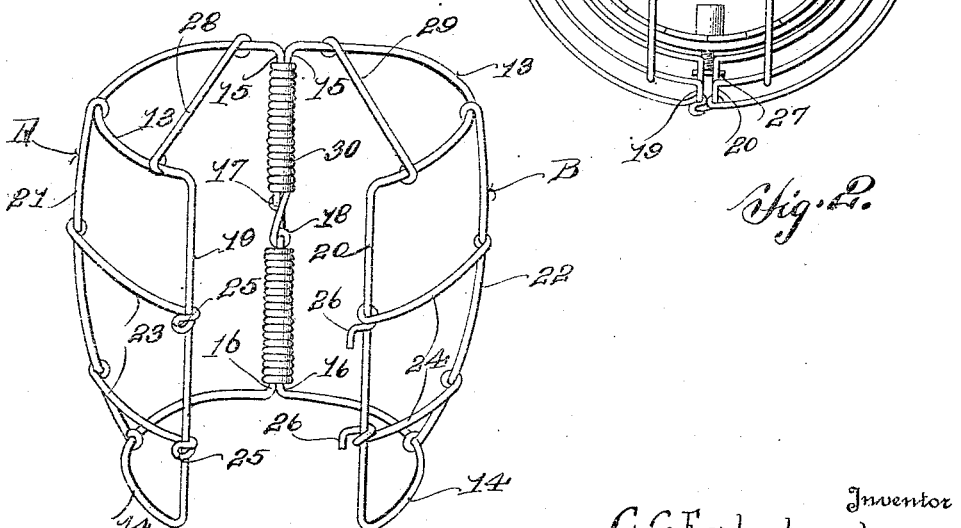
Witnesses
O. H. Cook
N. M. Test
Inventor
C. G. Earlenbaugh and
B. M. Paddison
By
Attorney

UNITED STATES PATENT OFFICE.

BERT M. PADDISON AND CLOYD G. EARLENBAUGH, OF AKRON, OHIO.

HEATING ATTACHMENT FOR GAS-LAMPS.

1,297,230.   Specification of Letters Patent.   Patented Mar. 11, 1919.

Application filed October 16, 1917.   Serial No. 196,928.

*To all whom it may concern:*

Be it known that we, BERT M. PADDISON and CLOYD G. EARLENBAUGH, citizens of the United States, residing at Akron, in the county of Summit, State of Ohio, have invented certain new and useful Improvements in Heating Attachments for Gas-Lamps; and we do hereby declare the following to be a full, clear, and exact description of the invention, such as will enable others skilled in the art to which it appertains to make and use the same.

This invention relates to improvements in attachments for the burners of gas lamps and particularly to such attachments which are adapted to support cooking vessels for the purpose of heating foods.

One object of the present invention is to provide a novel and simple device of this character which is especially adapted for attachment to the burner of a lamp of the Argand or Bunsen type.

Another object is to provide a device of this character which is simple and cheap in its construction and which can be easily and quickly applied to or removed from the burner, the same being strong and durable for the purpose of supporting a cooking vessel.

Other objects and advantages will be apparent from the following description when taken in connection with the accompanying drawing.

In the drawing:

Figure 1 is a side elevation of a lamp burner on which is arranged our improved vessel support.

Fig. 2 is a top plan view of the same.

Fig. 3 is a perspective view of the device removed from the burner and in partially open position.

Referring particularly to the accompanying drawing, 10 represents a burner of the Argand type which includes the gallery 11 and the chimney gripping fingers 12. On this gallery and embracing the lower portions of these fingers, my invention is especially adapted for engagement.

The device, as clearly seen in the drawing, is formed from and includes the two sections A and B. Each of these sections is formed from a single length of wire which is so bent as to produce the upper and lower concentric and semi-circular portions 13 and 14, respectively. The ends of these semi-circular portions are bent respectively downwardly and upwardly, as shown at 15 and 16, respectively, and these ends are joined together as shown at 17, and 18. At the diametrically opposite side of the device the sections have the vertical members 19 and 20, which are connected to the intermediate vertical members 21 and 22 by the curved horizontal members 23 and 24. The forward ends of the horizontal members 23 are coiled around the vertical member 19 and formed into loops or eyes 25 which receive the hook members 26 formed on the adjacent ends of the curved members 24, which members are coiled around the vertical members 20. The other ends of the members 23 and 24 are coiled around the vertical members 21 and 22, respectively. The lower portions of the vertical members 19 and 20, at the points of junction with the lower curved members 14, are slightly flared away from each other to avoid interference with the screw 27 of the burner. Connected to opposite portions of the upper curved members 13 and disposed in parallel relation, are the wires 28 and 29. These wires 28 and 29, in connection with the curved members 13 form a platform at the upper end of the device, on which the cooking vessel is adapted to be placed, and thus be properly supported over the flame of the burner, at such height as to utilize the full force of the heat from the flame, without danger of burning or smoking the vessel.

Coiled around the members 15 and 16, from the upper to the lower ends thereof, is a single length of wire, which, as shown at 30, holds the said portions together and provides a novel and effective hinge whereon the two sections may be readily swung into open and closed positions.

It will readily be seen that when the device is to be applied to the burner the sections are swung into open position and then brought around the burner so that the lower curved members 14 will surround the fingers of the burner and rest on the gallery thereof. The hook members are then engaged with the eye members, whereby the sections will be firmly held in proper position around the burner. A vessel can be then placed on the upper platform and the cooking of the food proceeded with in the manner which is understood.

While we have shown the device as formed for application for the burner of a gas lamp, it will readily be understood that the device may be readily modified for attachment to the ordinary gas jet. This will involve the change in the diameter of the lower portion of the sections, as will be readily understood.

What is claimed is:

A heating vessel support for a gas lamp including a pair of vertically disposed and outwardly bowed frames, each of the frames having a horizontal transverse bar on the upper end thereof, the rear of the frames being formed with vertical bars, means for connecting the front portions of the frames, and wire members coiled around the said rear bars to form a hinge whereby the frames are movably connected together.

In testimony whereof we affix our signatures in the presence of two witnesses.

BERT M. PADDISON.
CLOYD G. EARLENBAUGH.

Witnesses:
CLARENCE W. MAY,
DEAN F. MAY.